United States Patent
Rachut

(10) Patent No.: US 7,809,451 B2
(45) Date of Patent: Oct. 5, 2010

(54) METHOD FOR OPERATING AN AUTOMATION DEVICE

(75) Inventor: Holger Rachut, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 189 days.

(21) Appl. No.: 11/799,941

(22) Filed: May 3, 2007

(65) Prior Publication Data

US 2007/0244583 A1 Oct. 18, 2007

(30) Foreign Application Priority Data

May 4, 2006 (EP) .................................. 06009273

(51) Int. Cl.
G05B 11/01 (2006.01)
G06F 19/00 (2006.01)

(52) U.S. Cl. ............................ 700/86; 700/18; 700/181; 717/108

(58) Field of Classification Search ................... 700/17, 700/18, 83, 86, 87, 181; 717/107–108; 715/751
See application file for complete search history.

(56) References Cited

U.S. PATENT DOCUMENTS

| | | | |
|---|---|---|---|
| 7,418,300 B2 * | 8/2008 | Gikas et al. ................... | 700/18 |
| 2003/0200004 A1 * | 10/2003 | Renner ......................... | 700/182 |
| 2005/0159932 A1 * | 7/2005 | Thurner .......................... | 703/2 |
| 2006/0155392 A1 * | 7/2006 | Fay et al. ...................... | 700/18 |
| 2006/0206866 A1 * | 9/2006 | Eldrige et al. ................ | 717/122 |
| 2006/0259157 A1 * | 11/2006 | Thurner ........................ | 700/18 |

OTHER PUBLICATIONS

Martin Wollschleger, Jochem Müller; "Integration of Fieldbus Systems into On-line Asset Management Solutions base don Fieldbus Profile Descriptions"; 4th IEEE International Workshop on Factory Communication Systems; Aug. 28-30, 2002; pp. 89-96; XP010623297; ISBN: 0-7803-7586-6; Piscataway, NJ, USA.

Wolfgang Kastner and Friedrich Kastner-Masilko; "EDDL inside FDT/DTM"; Factory Communication Systems; 2004; Proceedings 2004 IEEE International Workshop on Vienna, Austria; Sep. 22-24, 2004; pp. 365-368; XP010756169; ISBN: 0-7803-8734-1; Piscataway, NJ, USA.

Martin Augustin, Jurt Polzer and Wolfgang OTT; "Electronic Device Description Language—Basis for a common and platform-independent device operation"; Oct. 1999; pp. 24-28 and 30-32; vol. 41, No. 10; XP001172967; ISSN: 0178-2320; Munich, Germany.

René Simon, Matthias Riedl, Christian Diedrich; "Integration of Field Devices using Field Device Tool (FDT) on the basis of Electronic Device Descriptions (EDD)"; Industrial Electronics, 2003; ISIE '03; 2003 IEEE International Symposium on Jun. 9-11, 2003; pp. 189-194; vol. 1; XP010682646; ISBN: 0-7803-7912-8; Piscataway, NJ, USA.

René Simon, Peter Neumann, Christian Diedrich, Matthias Riedl; "Field Devices—Models and their Realisations"; Industrial Technology, 2002; IEEE ICIT '02; 2002 IEEE International Conference on Dec. 11-14, 2002; pp. 307-312; vol. 1; XP010637322; ISBN: 0-7803-7657-9; Piscataway, NJ, USA.

* cited by examiner

Primary Examiner—Albert DeCady
Assistant Examiner—Douglas S Lee

(57) ABSTRACT

A method is specified for operating an automation system, wherein a description object appropriate to a type of the respective program code object and a description object reference referencing the respective description object are created when a program code object is instantiated, so that it is possible to completely decouple applications, in other words the program code object as a component of the respective automation solution, and information data compiled in the description object.

19 Claims, 1 Drawing Sheet

METHOD FOR OPERATING AN AUTOMATION DEVICE

CROSS REFERENCE TO RELATED APPLICATIONS

This application claims priority of European application No. 06009273.1 EP filed May 4, 2006, which is incorporated by reference herein in its entirety.

FIELD OF INVENTION

The invention relates to a method for operating an automation device, wherein the automation device is suitable for and is provided for execution of an automation solution in a manner known per se, especially a user-specific control program or similar, wherein an automation solution of this type includes at least a program code object, e.g. what is known as a function module.

BACKGROUND OF INVENTION

Such automation devices as well as a generic method for operating such an automation device are generally known.

However, a partially unfavorable utilization of resources of known automation devices has proved to be disadvantageous. An automation system for automation of a technological process generally includes a process control system/automation system, in other words at least an automation device of the above-mentioned type or a plurality of such automation devices, wherein a communication link exists between them, as well as local or central peripherals. These components are generally monitored within the automation system, e.g. for their diagnostic state. For this purpose, what is known as asset management is especially provided. However, one of the tasks of asset management is to monitor not only the components of the automation system but also components of the technological process, for example pipelines, control loops, tanks, technological subsystems, etc. To date such state monitoring and/or diagnostics have been performed using the respective automation solution, in other words especially the automation program. The automation program here generates the state to be displayed in each case and, in the event of deviations from the normal state, the messages pertaining to this. To achieve a meaningful description of the monitored components, larger data volumes are necessary. The data required for such asset management or comparable applications is in the main static data. Examples of such data are in particular identity data of the component to be monitored, in particular what is known as a tag, a system identifier, a location identifier, descriptions, manufacturer's details, type information, hardware/software information, time information (e.g. construction data), etc, as well as text libraries containing language-dependent texts, component-specific message texts, composable detailed diagnostic texts, instructional texts for operator actions, display texts for use in a graphical user interface, etc., as well as the integration of manufacturer-specific documents containing e.g. images, manuals, audio/video files, technical drawings, etc. To date such data has at the most been used in the form of very short texts in the automation program, wherein the respective texts were difficult to incorporate into the automation program. Moreover, the use of language-dependent texts, which is desirable, has to date been very difficult and the cost of maintenance and changes is extremely high.

SUMMARY OF INVENTION

According to the invention, the above data in particular should be compiled locally in a description object, if appropriate a collection containing a plurality of description objects, in order to avoid or at least reduce such disadvantages and to provide additional information and greater flexibility when accessing and using such information.

For this purpose, a method is provided for operating an automation device in accordance with the features of a independent claim. By instantiating a program code object on the automation device a description object appropriate to a type of the respective program code object is created and a description object reference referencing the respective description object is stored in the program code object. The above-mentioned and if appropriate further data is thus held by at least one description object. The program code object thus no longer includes the respective data directly, but accesses the description object in order to use such data. The description object reference is provided for this purpose, and is stored in the program code object or is associated with the program code object in some other suitable manner.

Preferably the creation of the description object includes a display of description objects which may be appropriate to the type of the relevant program code object, as well as an option for the user to select from the set of displayed program code objects, so that when several description objects come under consideration the user has an opportunity of influencing the creation of a particular description object in conjunction with a program code object.

It is also preferably provided that when the description object is created an editing function or similar for storing description data, in other words e.g. data of the type referred to in the introduction, is called up in the description object. This results in a fixed work sequence which begins with the instantiation of a program code object and which in conjunction with the creation of a description object appropriate to the program code object not only permits data to be stored in the description object, but also makes it apparent to the user because of the close temporal connection, so that the information required by the user in each case, in other words especially by the system programmer, need only be compiled once.

If the automation device is at least assigned a visualization apparatus, it is provided in accordance with a preferred form of embodiment that when a program code object is instantiated on the automation device a program code object reference referencing the respective program code object is created on the visualization apparatus. A direct connection then exists between the respective program code object and a visualization running on the visualization device in a manner known per se, in that the relevant program code object and thus the description object can be accessed for the visualization on the basis of the program code object reference.

The program code object is preferably what is known as a CFC function module (CFC=Continuous Function Chart), so that the invention can be used in conjunction with a graphical configuration and commissioning of the automation functions.

The description object further preferably includes description data in both a machine-readable and a user-readable format, in particular in accordance with what is known as the "Electronic Device Description" (EDD); the EDD is the result of the description of an object using the "Electronic Device Description Language" (EDDL), which is standardized in IEC 61804. Other examples of both user-readable and machine-readable formats are XML or other "mark-up formats", in particular HTML, SGML, etc.

In order to reproduce the information held in the respective referenced description object the program code object accesses the description object on the basis of the description object reference. If the visualization apparatus needs to access the description object, the visualization apparatus, in order to reproduce information held in a description object, initially accesses the respective program code object on the basis of the program code object reference and then accesses the description object via the description object reference associated with the program code object. Thus even when the respective data is stored on a distributed basis, in other words the data contained by the description object on the one hand and the program code data on the other hand, the coherence of the respective data and its availability are always guaranteed.

The invention also relates further to a computer program or a computer program product with the features of the relevant claims for implementation of the inventive method on a computer, in other words e.g. an automation device of the type referred to in the introduction.

The advantage of the invention and its embodiments thus consists in particular in the fact that the resources are optimally used on the part of the or each automation device, because memory available there is available almost exclusively to the program code objects required for the respective automation solution. Other data can nevertheless be accessed at any time for the program code objects, namely via a description object reference which is stored in the program code object or associated with the program code object and which references a description object belonging to the respective program code object, said description object in turn including, in particular in a format which is both machine-readable and user-readable, data, such as e.g. language-dependent texts, manufacturer's information, manuals, etc. Depending on the extent of the data complied by such description objects, provision can be made for storage on a remote device communicatively linked to the automation device and/or the visualization apparatus.

The patent claims filed with the application are proposed formulations without prejudice to the achievement of more extensive patent protection. The applicant reserves the right to claim further combinations of features hitherto only disclosed in the description and/or drawing.

The or each exemplary embodiment must not be understood as a restriction of the invention. Rather, numerous alterations and modifications are possible in the context of the present disclosure, which for example the person skilled in the art is taught with regard to the solution of the problem by a combination or restatement of individual features or elements or method steps described in the general or special description section and contained in the claims and/or the drawing and which because features can be combined result in a new subject matter or new method steps or sequences of method steps.

References used in subclaims refer to the further embodiment of the subject matter of the main claim by the features of the respective subclaim; they must not be understood as a surrender of the attainment of independent, concrete protection for the combinations of features of the related subclaims. Furthermore, it must be assumed in respect of an interpretation of the claims in the event of a feature in a subsequent claim being put into more concrete form that no such restriction exists in the respective preceding claims.

Because the subject matters of the subclaims in respect of the prior art may form separate and independent inventions on the priority date, the applicant reserves the right to make them the subject matter of independent claims or declarations of division. Furthermore, they can also include independent inventions which have a design independent of the subject matters of the preceding subclaims.

BRIEF DESCRIPTION OF THE DRAWINGS

An exemplary embodiment of the invention will be explained in greater detail below on the basis of the drawing. Objects or elements corresponding to one another are given the same reference characters in all figures.

The figures show.

DETAILED DESCRIPTION OF INVENTION

Figure 1:
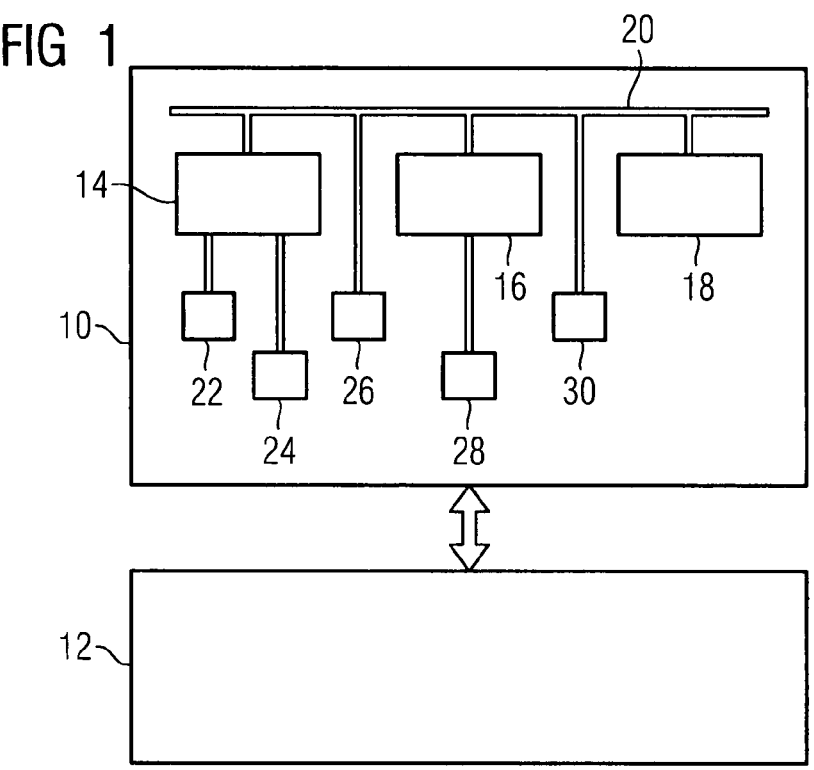
FIG. 1 a diagrammatically simplified representation of an automation system for controlling a technical process, and FIG. 2 a program code object instantiated in the area of the automation system with a reference to an external description object.

FIG. 1 shows in diagrammatically simplified form an automation system 10, which is provided in a manner known per se for controlling and/or monitoring a technical process 12 (not shown in more detail), e.g. a production apparatus. In the embodiment shown, the automation system 10 includes a first and a second automation device 14, 16 as well as a visualization apparatus 18. The automation devices 14, 16 and the visualization apparatus 18 are communicatively linked, e.g. via a bus 20, to one another in a manner known per se. In order to directly or indirectly influence the technical process 12 or to take over data from the technical process 12 the automation system 10 includes peripheral devices 22, 24, 26, 28, 30, which are either assigned to one of the automation devices 14, 16 directly or are communicatively linked to the automation devices 14, 16. The peripheral devices 22 to 30 are provided especially for controlling actuators (not shown) in the technical process 12, e.g. motors, or for taking over data from sensor systems (likewise not shown), e.g. temperature sensors, position switches, etc., assigned to the technical process 12.

Figure 2:
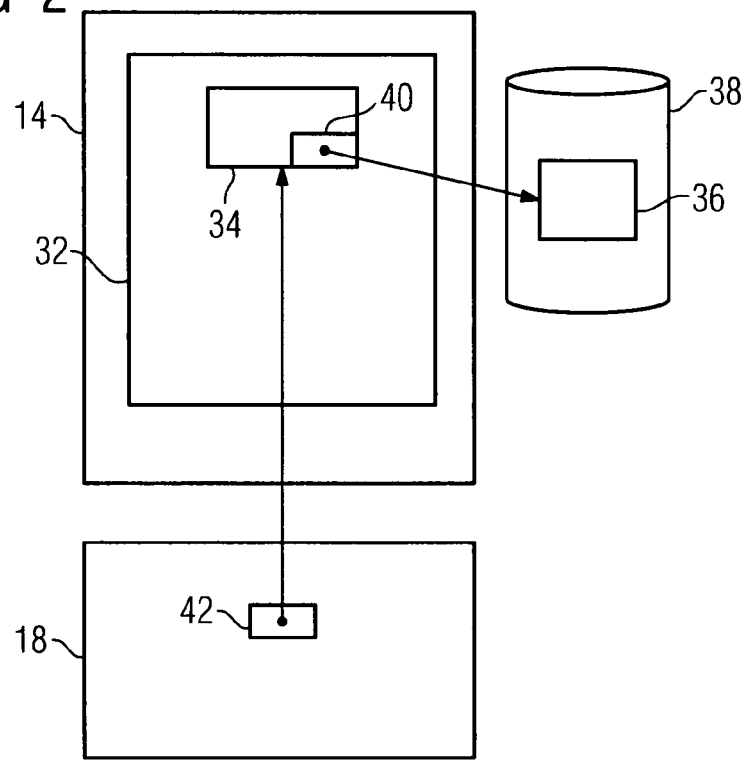

In order to control and/or monitor the technical process 12 an automation solution 32, in other words in particular a control program, is provided, which is represented in diagrammatically simplified form in FIG. 2. The automation solution 32 is executed by the or each automation device 14, 16 (FIG. 1). A separate automation solution 32 can also be provided for each automation device 14, 16. The automation solution 32 includes at least a program code object 34, e.g. what is known as a function module, in particular in an embodiment as a CFC function module (CFC=Continuous Function Chart). The or each program code object 34 is part of the automation solution 32 and is assigned to the respective automation solution 32 when the automation solution 32 is created by means of an instantiation of a corresponding program object type. In line with approaches known in the prior art, such program code objects 34 include short texts or similar, if these need to be displayed in the context of the automation solution 32. The invention now breaks with the approach of directly assigning such data to the program code object 34. Instead, such data is held in a description object 36. One or more description objects 36 can then be combined into a description object database 38. In order to access the relevant description object 36, provision is made for a description object 36 appropriate to the program object type to be created, in other words in particular instantiated, when a program code object 34 is instantiated, and for a description object reference 40 referencing the respective description object 36 to be stored in the program code object 34 or to be associated with the program code object 34 in some other suitable manner. The data included by the description object 36 can thus be exported from the automation solution 32, at least however from the respective program code object 34. The or each description object 36 or the description object database 38 can even be held on a device, e.g. the visualization apparatus 18, remote from the respective automation device 14, 16.

As likewise shown in FIG. 2, the invention also provides that, in accordance with an especially preferred embodiment, if the automation device 14, 16 is assigned at least a visualization apparatus 18, a program code object reference 42 referencing the respective program code object 34 is created on the visualization apparatus 18 when a program code object 34 is instantiated on the automation device 14, 16. In order to reproduce information held in a description object 36, the visualization apparatus 18 initially accesses the respective program code object 34 on the basis of the program code object reference 42 and then accesses the description object 36 via the description object reference 40 associated with the program code object 34. The data stored in the description object 36, especially data compiled in accordance with what is known as an "Electronic Device Description" (EDD), is thereby available for display on the visualization apparatus 18, which implements e.g. what is known as a human-machine interface (HMI), especially in the form of a graphical user interface.

A particular advantage of the invention is a decoupling of the automation solution 32, in other words the respective application, from information data. It is possible to record any components of a technological system or of a technical process in asset management on the basis of standardized mechanisms or standardized information profiles. What are known as process-related components, in other words the or each automation device 14, 16 and or peripheral devices 22 to 30 are relieved of data which has to be loaded but which is not immediately necessary for the automation. Databases and the like can be used to store information. The data compiled in a description object 36 or contained by a description object 36 permits manufacturer-specific or project-specific documents and files to be integrated on a variable basis. Moreover, the data compiled in the or each description object 36 is language-independent, especially if the EDD format is used as the basis for language independence. In principle any data, in other words e.g. including conversion factors and similar, can be taken over into the automation solution 32 via the description objects 36. A further example of data made available by the description object 36 is text libraries, e.g. in the form of manuals or instructional texts for operator actions.

Thus the invention can be briefly represented as follows:

A method is specified for operating an automation system 10, wherein a description object 36 appropriate to a type of the respective program code object 34 and a description object reference 40 referencing the respective description object 36 are created when a program code object 34 is instantiated, so that it is possible to completely decouple applications, in other words the program code object 34 as a component of the respective automation solution 32, and information data compiled in the description object 36.

The invention claimed is:

1. A method for operating an automation device, wherein the automation device executes an automation solution having at least a program code object, comprising:

instantiating the program code object on the automation device to provide a software program for the automation device, the solution comprising program code;

creating a description object comprising data appropriate to a specific type of the program code object based upon the instantiation, said data including information different from information present in the program code object for use in conjunction with operation of the program code object;

storing the description object in a database separate and apart from the automation device and with other, different description objects associated with different devices;

storing a description reference in the program code object, wherein the description reference refers to the description object so that during normal operation of the automation device the data in the description object which is appropriate to the specific type of the program code object can be accessed; and providing access to the description object during operation of the automation device via the description reference in order for the instantiated program code to use data of the description object which is information different from information present in the program code object in conjunction with operation of the program code object.

2. The method as claimed in claim 1, further including display of the description object during operation of the automation device.

3. The method as claimed in claim 1, wherein an editing function to store data in the description object is called up when the description object is created.

4. The method as claimed in claim 1, wherein at least a visualization device is assigned to the automation device and wherein a program code object reference referencing the respective program code object is stored on the visualization apparatus, when the program code object is instantiated on the automation device.

5. The method as claimed in claim 1, wherein the program code object is a continuous function chart function module.

6. The method as claimed in claim 1, wherein the description object has description data in a machine-readable format and in a format readable by a user.

7. The method as claimed in claim 1, wherein the description object has data based upon a electronic device description format.

8. The method as claimed in claim 1, wherein the program code object accesses the description object based upon the description object reference to reproduce information held in the respective referenced description object.

9. The method as claimed in claim 4, wherein the visualization device accesses the program code object to reproduce information held in a description object based upon the program code object reference, and wherein the description object reference associated with the program code object is then used to access the description object.

10. An automation system, comprising:

an automation device;

a type of a program code object instantiated in the automation device to provide a software program for the automation device, the solution comprising program code;

a first description object stored in a database separate and apart from the automation device and with other different description objects associated with different devices, the first description object providing information relating to the program code object which is different from information present in the program code object for use in conjunction with operation of the program code object; and a description object reference provided with the program code object to provide access to information in the description object during operation of the automation device by referencing the description object stored in the database program code object during operation of the automation device via the description reference in order for the instantiated program code to use data of the description object which is information different from information present in the program code object in conjunction with operation of the program code object.

11. The automation device as claimed in claim 10, wherein the program code object is a continuous function chart function module.

12. The automation device as claimed in claim 11, wherein the description object has data based upon a electronic device description format.

13. The automation device as claimed in claim 11, wherein the description object has data based upon XML.

14. The automation device as claimed in claim 11, wherein the description object has data based upon HTML.

15. The automation device as claimed in claim 11, wherein the description object has data based upon SGML.

16. The automation device as claimed in claim 11, wherein the description object has data of a manual.

17. The automation device as claimed in claim 11, wherein the description object has data selected from the group consisting of: a location identifier, a construction data based on a time, and a text library containing language-dependent texts.

18. The method as claimed in claim 1, including a display of a plurality of description objects appropriate to the type of the respective program code object, wherein the description objects displayed are selected by a user.

19. The method as claimed in claim 18, wherein an editing function to store data in the description object is called up when the description object is created, and wherein the automation device is assigned at least a visualization device and wherein a program code object reference referencing the respective program code object is stored on the visualization apparatus, when the program code object is instantiated on the automation device.

* * * * *